US006957637B2

(12) United States Patent
Lin et al.

(10) Patent No.: US 6,957,637 B2
(45) Date of Patent: Oct. 25, 2005

(54) PRESSURE REGULATOR FOR ENGINE

(76) Inventors: Kuo Chang Lin, P.O.Box 63-298, Taichung (TW) 406; Chau Hwe Chen, P.O.Box 63-298, Taichung (TW) 406

( * ) Notice: Subject to any disclaimer, the term of this patent is extended or adjusted under 35 U.S.C. 154(b) by 0 days.

(21) Appl. No.: 10/752,974

(22) Filed: Jan. 5, 2004

(65) Prior Publication Data

US 2004/0139941 A1 Jul. 22, 2004

Related U.S. Application Data

(63) Continuation-in-part of application No. 10/171,991, filed on Jun. 17, 2002, now abandoned.

(51) Int. Cl.[7] .............................................. F02M 35/10
(52) U.S. Cl. ................................. 123/184.53; 123/527
(58) Field of Search ...................... 123/184.53, 184.21, 123/527, 557, 525, 526, 514

(56) References Cited

U.S. PATENT DOCUMENTS

| | | | | |
|---|---|---|---|---|
| 5,483,943 | A | 1/1996 | Peters | |
| 6,345,611 | B1 | 2/2002 | Hartman et al. | |
| 6,802,299 | B2 * | 10/2004 | Mischker et al. | 123/480 |

* cited by examiner

*Primary Examiner*—Henry C. Yuen
*Assistant Examiner*—Hyder Ali
(74) *Attorney, Agent, or Firm*—Charles E. Baxley

(57) ABSTRACT

An engine device includes a pressure regulator coupled to the engine, a container, and a needle tube mechanism disposed in the container and having a block coupled to the engine with a pipe, to receive gas from the engine. The block includes a slit connected to the pipe and a channel communicating with the slit and the chamber of the container, the slit of the block includes an inner diameter smaller than that of the channel of the block, and arranged to allow the gas from the engine to flow through the slit and the channel of the block when the engine is over-pressurized, and to allow the gas in the container to flow into the engine in order to balance a pressure in the engine when the pressure in the engine is too low.

5 Claims, 3 Drawing Sheets

PRESSURE REGULATOR FOR ENGINE

The present invention is a continuation-in-part of U.S. patent application Ser. No. 10/171,991, filed Jun. 17, 2002, to be abandoned.

BACKGROUND OF THE INVENTION

1. Field of the Invention

The present invention relates to a pressure regulator, and more particularly to a pressure regulator for engines, such as automotive internal combustion engines or the like of an engine system.

2. Description of the Prior Art

Various kinds of typical fuel pressure regulators have been developed and attached to engines, such as automotive internal combustion engines or the like, which are required to furnish gaseous fuel into the combustion chambers. The fuel pressure regulators are provided for reducing fuel pressure from a relatively higher tank pressure to a relatively lower pressure required for induction into an engine.

For example, U.S. Pat. No. 5,483,943 to Peters discloses one of the typical fuel pressure regulators are also developed to provide or to furnish gaseous fuel into the combustion chambers of the automotive internal combustion engines or the like. However, the typical fuel pressure regulators may not be used to balance the pressure within the combustion chambers or within the automotive internal combustion engines or the like.

U.S. Pat. No. 6,345,611 to Hartman et al. discloses another typical fuel pressure regulator having a heater mounted to the pressure reducing regulator to warm the fuel after the temperature is reduced by the pressure reduction. However, similarly, the typical fuel pressure regulators also may not be used to balance the pressure within the combustion chambers or within the automotive internal combustion engines or the like.

The present invention has arisen to mitigate and/or obviate the afore-described disadvantages of the conventional pressure regulators.

SUMMARY OF THE INVENTION

The primary objective of the present invention is to provide a pressure regulator for an engine system and for balancing the pressure within the combustion chambers or within the automotive internal combustion engines or the like.

In accordance with one aspect of the invention, there is provided an engine system comprising an engine, a pressure regulator coupled to the engine, and including a container having a chamber formed therein, and a needle tube mechanism disposed in the chamber of the container and including a block coupled to the engine with a pipe, to receive gas from the engine, the block includes a slit formed therein and connected to the pipe and includes a channel formed therein and communicating with the slit thereof and communicating with the chamber of the container, the slit of the block including an inner diameter smaller than that of the channel of the block. The slit and the channel of the block are arranged to allow the gas from the engine to flow into the pipe and then to flow through the slit of the block, and then to flow through the channel of the block, and then into the chamber of the container when the engine is over-pressurized, and the slit and the channel of the block are also arranged to allow the gas in the chamber of the container to flow into the channel of the block, and then to flow through the slit of the block, and then to flow into the engine via the pipe, in order to balance a pressure in the engine when the pressure in the engine is too low.

The container includes an opening formed therein and communicating with the chamber thereof, for pressure relieving purposes.

The block includes a control valve attached thereto and engageable into the channel of the block, to control the gas to flow through the channel and the slit of the block. The block includes a screw hole formed therein and communicating with the channel of the block, the control valve is threaded to the screw hole of the block, and engageable into the channel of the block.

A water tank may further be provided and coupled to the engine to receive and supply cooling water to the engine, a separator housing coupled between the water tank and the engine to receive heated cooling water and air from the engine, and a storage housing coupled to the water tank to receive the air from the water tank, and coupled to the engine to supply the air into the engine.

The water tank includes an upper portion having a mouth provided thereon and coupled to the separator housing to receive the air from the separator housing, and the mouth is coupled to the storage housing, to supply the air to the storage housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
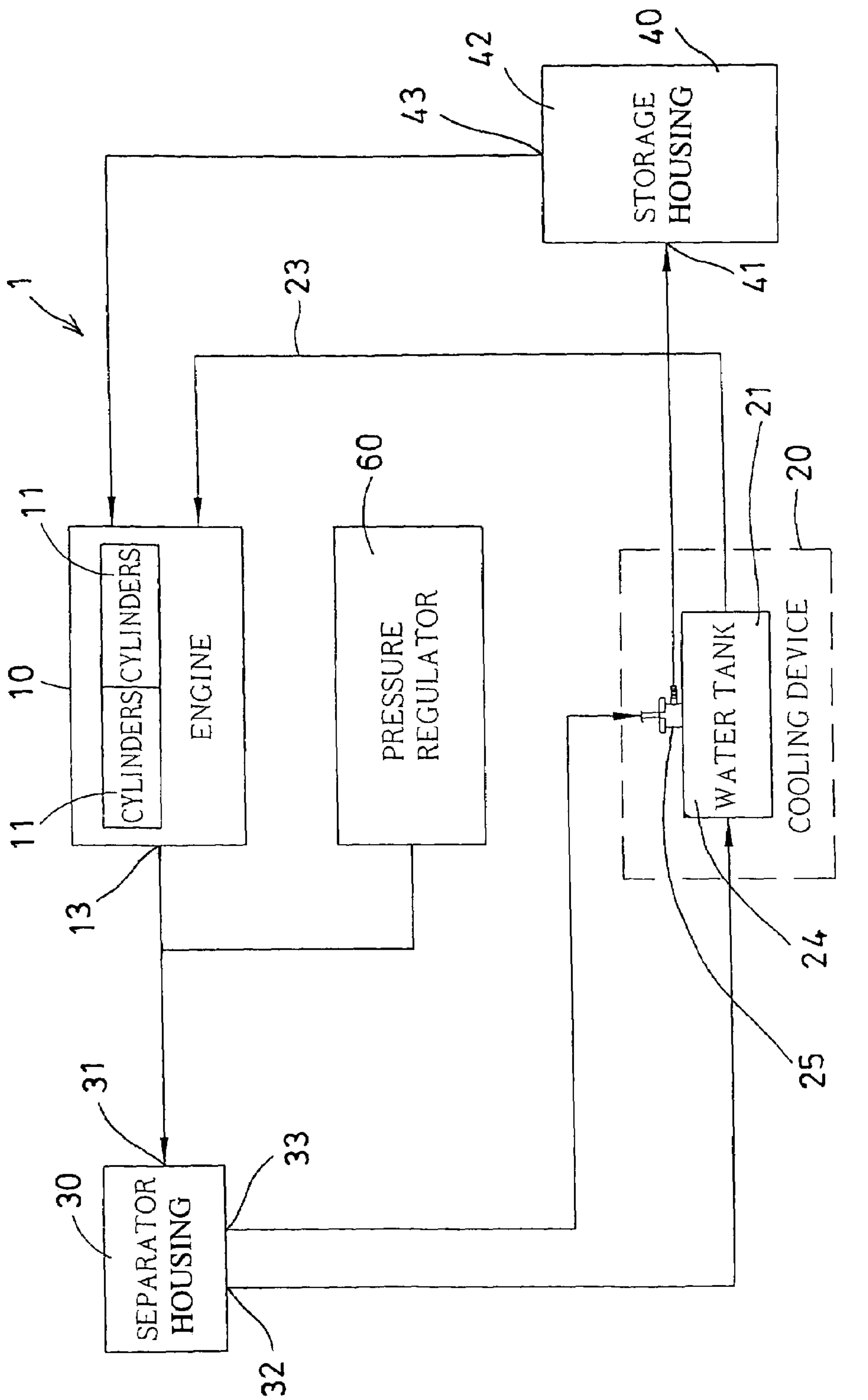
FIG. 1 is a block diagram illustrating an engine system having a pressure regulator in accordance with the present invention.
Figure 2:
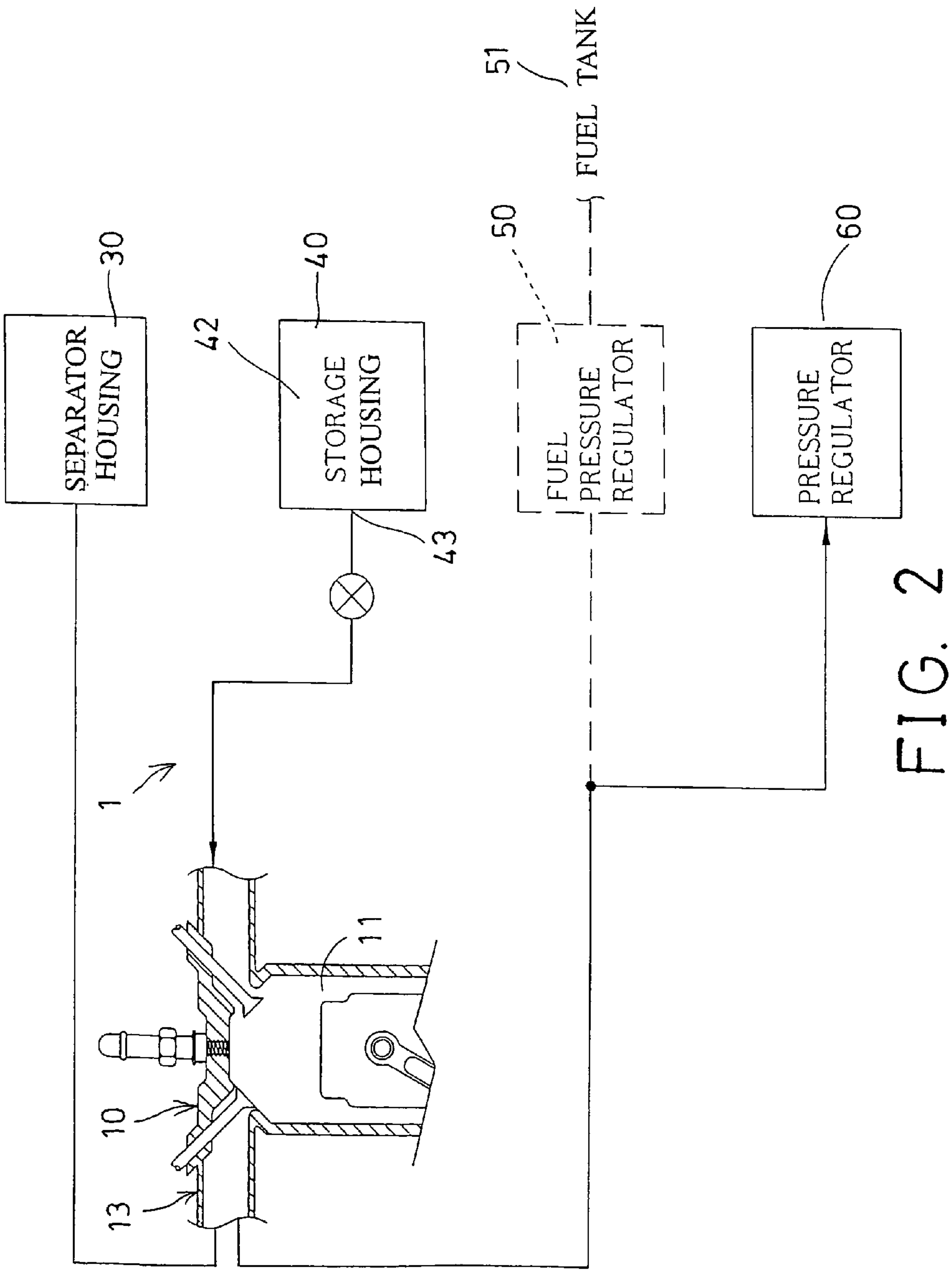
FIG. 2 is a schematic view illustrating a portion of the engine system.

Referring to the drawings, and initially to FIGS. 1 and 2, an engine system 1 in accordance with the present invention comprises an engine 10 including one or more cylinders 11 provided therein, a usual cooling device 20 including a water tank 21 coupled to the engine 10 with a tubing 23, to supply cooling water to the engine 10 and to cool the engine.

A separate housing 30 includes an inlet 31 coupled to an outlet 13 of the engine 10, to receive heated and pressurized air or gas from the engine 10. After circulating through the engine 10, the air or gas will be heated by the engine 10 to a high temperature, and may have a portion evaporated into vapor or air or gas, such as hydrogen and/or oxygen or the like that will flow to the upper portion of the separate housing 30.

The separate housing 30 further includes an outlet 32 preferably coupled to the lower portion of the water tank 21, to output the liquid and heated cooling water to the water tank 21, and includes another outlet 33 coupled to such as the upper portion of the water tank 21, to output the evaporated vapor or air or gas or hydrogen and/or oxygen or the like into a mouth 25 of the water tank 21 that is communicated with an upper portion 24 of the water tank 21.

It is preferable that the inside of the water tank 21 is maintained in a high temperature that is good enough to continuously separating or evaporating the cooling water into the evaporated vapor or air or gas or hydrogen and/or oxygen or the like, for allowing much more evaporated vapor or air or gas or hydrogen and/or oxygen or the like to be generated and received in the water tank 21.

A storage housing 40 is further provided and includes an inlet 41 coupled to the mouth 25 of the water tank 21, for receiving the evaporated vapor or air or gas or hydrogen and/or oxygen or the like from the water tank 21, and includes a chamber 42 provided therein to receive and store the evaporated vapor or air or gas or hydrogen and/or oxygen or the like.

The storage housing 40 further includes an outlet 43 coupled to the engine 10, to supply the air or hydrogen or oxygen or the like into the engine 10, in order to facilitate the combustion operation of the engine 10, and to reduce discharging carbon dioxide or other waste gas. When too much air or hydrogen or oxygen or the like is supplied into the engine 10, the engine 10 may have a good chance to be over-pressurized.

As shown in dotted lines in FIG. 2, a usual fuel pressure regulator 50 is required to be provided and coupled to the engine 10 to adjust the fuel pressure of the engine 10, and may be coupled to the fuel tank 51 to collect surplus fuel that may be over supplied or injected into the engine 10.

However, it is to be noted that, in the engine system 1 in accordance with the present invention, the supplying of the air or hydrogen or oxygen or the like into the engine 10 may facilitate the combustion of the engine 10, for allowing the fuel to be completely combusted, and such that no surplus fuel may be generated and is not required to be collected in the engine system 1 in accordance with the present invention.

A pressure regulator 60 may further be provided and coupled between the engine 10 and the fuel pressure regulator 50, to adjust the pressure in the engine 10 or in the tubings 23 of on the outlet 13 of the engine system 1.

Figure 3:
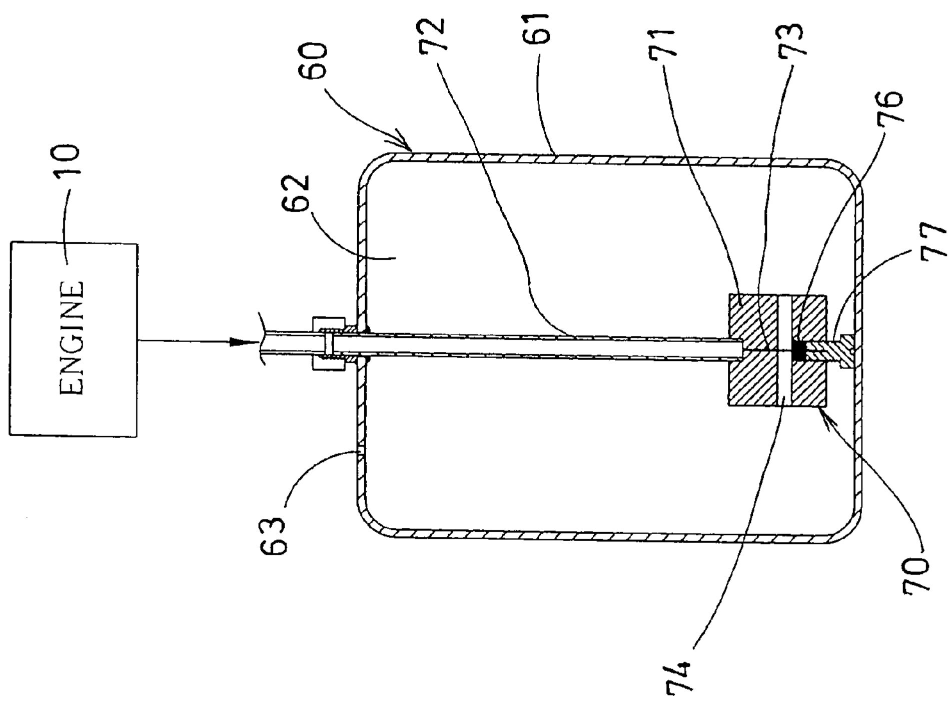
FIG. 3 is a partial cross sectional view showing the pressure regulator of the engine system.

As shown in FIG. 3, the pressure regulator 60 includes a container 61 having a chamber 62 formed therein, and having an opening 63 formed in the upper portion thereof and communicating with the chamber 62 thereof, for pressure releasing or relieving purposes.

A needle tube mechanism 70 is disposed in the chamber 62 of the container 61, and includes a block 71 coupled to the engine 10 with a pipe 72, to receive the pressurized air or gas or the like from the outlet 13 of the engine 10.

Due to the much smaller inner diameter of the slit 73 of the block 71 than that of the channel 74 of the block 71, the pressurized air or gas from the engine 10 may only flow through the slit 73 of the block 71 and into the channel 74 of the block 71 when the pressurized air or gas from the engine 10 reaches a predetermined pressure, in which the predetermined pressure of the pressurized air or gas from the engine 10 may be determined by the inner diameter of the slit 73 of the block 71, or by the difference between the inner diameters of the slit 73 of the block 71 and the channel 74 of the block 71.

On the contrary, when the pressure within the engine 10 is lowered than a predetermined pressure, to form a negative pressure between the engine 10 and the pipe 72 and the channel 74 of the block 71, the air or gas is allowed to flow from the chamber 62 of the container 61 into the channel 74 of the block 71, and then through the narrower slit 73 of the block 71, and then to flow into the engine 10 via the pipe 72, in order to compensate or the balance the pressure in the engine 10.

As also shown in FIG. 3, the block 71 may further include a screw hole 76 formed therein and communicating with the channel 74 and/or the slit 73 thereof, and a control valve 77 threaded to the screw hole 76 thereof, and engageable into the channel 74 of the block 71, in order to control the air or gas flowing through the channel 74 and/or the slit 73 of the block 71.

Accordingly, the pressure regulator may be provided for balancing the pressure within the combustion chambers or within the automotive internal combustion engines or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An engine system comprising:

an engine, a pressure regulator coupled to said engine, and including a container having a chamber formed therein, and having an opening formed therein and communicating with said chamber thereof, for pressure relieving purposes, and a needle tube mechanism disposed in said chamber of said container and including a block coupled to said engine with a pipe, to receive gas from said engine, said block includes a slit formed therein and connected to said pipe and includes a channel formed therein and communicating with said slit thereof and communicating with said chamber of said container, said slit of said block including an inner diameter smaller than that of said channel of said block, said slit and said channel of said block being arranged to allow the gas from said engine to flow into said pipe and then to flow through said slit of said block, and then to flow through said channel of said block, and then into said chamber of said container when said engine is over-pressurized, and said slit and said channel of said block being arranged to allow the gas in said chamber of said container to flow into said channel of said block, and then to flow through said slit of said block, and then to flow into said engine via said pipe, in order to balance a pressure in said engine when the pressure in said engine is too low.

2. An engine system comprising:

an engine, a pressure regulator coupled to said engine, and including a container having a chamber formed therein, and a needle tube mechanism disposed in said chamber of said container and including a block coupled to said engine with a pipe, to receive gas from said engine, said block includes a slit formed therein and connected to said pipe and includes a channel formed therein and communicating with said slit thereof and communicating with said chamber of said container, said slit of said block including an inner diameter smaller than that of said channel of said block, said slit and said channel of said block being arranged to allow the gas from said engine to flow into said pipe and then to flow through said slit of said block, and then to flow through said channel of said block, and then into said chamber of said container when said engine is over-pressurized, and said slit and said channel of said block being arranged to allow the gas in said chamber of said container to flow into said channel of said block, and then to flow through said slit of said block, and then to flow into said engine via said pipe, in order to balance a pressure in said engine when the pressure in said engine is too low, and said block including a control valve attached thereto and engageable into said channel of said block, to control the gas to flow through said channel and said slit of said block.

3. The engine system as claimed in claim 2, wherein said block includes a screw hole formed therein and communicating with said channel of said block, said control valve is threaded to said screw hole of said block, and engageable into said channel of said block.

4. An engine system comprising:

an engine, a pressure regulator coupled to said engine, and including a container having a chamber formed therein, and a needle tube mechanism disposed in said chamber of said container and including a block coupled to said engine with a pipe, to receive gas from said engine, said block includes a slit formed therein and connected to said pipe and includes a channel formed therein and communicating with said slit thereof and communicating with said chamber of said container, said slit of said block including an inner diameter smaller than that of said channel of said block, said slit and said channel of said block being arranged to allow the gas from said engine to flow into said pipe and then to flow through said slit of said block, and then to flow through said channel of said block, and then into said chamber of said container when said engine is over-pressurized, and said slit and said channel of said block being arranged to allow the gas in said chamber of said container to flow into said channel of said block, and then to flow through said slit of said block, and then to flow into said engine via said pipe, in order to balance a pressure in said engine when the pressure in said engine is too low, and a water tank coupled to said engine to receive and supply cooling water to said engine, a separator housing coupled between said water tank and said engine to receive heated cooling water and air from said engine, and a storage housing coupled to said water tank to receive the air from said water tank, and coupled to said engine to supply the air into said engine.

5. The engine system as claimed in claim 4, wherein said water tank includes an upper portion having a mouth provided thereon and coupled to said separator housing to receive the air from said separator housing, and said mouth is coupled to said storage housing, to supply the air to said storage housing.

* * * * *